United States Patent
Wu et al.

(10) Patent No.: US 8,960,987 B2
(45) Date of Patent: Feb. 24, 2015

(54) HOLLOW BACKPLANE AND BACKLIGHT MODULE USING SAME

(75) Inventors: Zexin Wu, Guangdong (CN); Yuchun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/699,065

(22) PCT Filed: Sep. 14, 2012

(86) PCT No.: PCT/CN2012/081372
§ 371 (c)(1),
(2), (4) Date: May 14, 2013

(87) PCT Pub. No.: WO2014/036755
PCT Pub. Date: Mar. 13, 2014

(65) Prior Publication Data
US 2014/0071708 A1    Mar. 13, 2014

(51) Int. Cl.
*F21V 7/04*        (2006.01)
*F21V 8/00*        (2006.01)

(52) U.S. Cl.
CPC .................................. *G02B 6/0085* (2013.01)
USPC ........... 362/633; 362/97.1; 362/373; 362/632

(58) Field of Classification Search
CPC ............. G02F 1/133608; G02F 2001/133628; G02F 2001/133314; G02F 2001/133328; G02F 1/133385
USPC ........ 362/97.1, 97.2, 294, 373, 632, 633, 634
See application file for complete search history.

(56) References Cited

U.S. PATENT DOCUMENTS

2006/0268580 A1* 11/2006 Kuo et al. ..................... 362/632
2011/0242793 A1* 10/2011 Lin et al. ..................... 362/97.1

FOREIGN PATENT DOCUMENTS

| CN | 101604098 A | 12/2009 |
| CN | 102392997 A | 3/2012 |
| CN | 102401351 A | 4/2012 |

* cited by examiner

*Primary Examiner* — Anh Mai
*Assistant Examiner* — Meghan Dunwiddie
(74) *Attorney, Agent, or Firm* — Andrew C. Cheng

(57) ABSTRACT

The present invention provides a hollow backplane and a backlight module using the backplane. The backplane includes a main body and a heat sink mounted on the main body. The main body includes a bottom board and a side board connected to the bottom board. The bottom board forms a plurality of hollow sections. Reinforcement ribs are arranged in the hollow sections. The heat sink is mounted to the bottom board. The bottom board of hollow backplane is made of plastics and forms hollow sections so as to reduce the weight of the backplane. The reinforcement ribs help maintaining the strength of the backplane. With the strength being maintained, the backplane greatly reduces weight, lowers down cost, and is favorable for weight reduction of liquid crystal display device. Further, the backplane has a simple structure and is easy to manufacture, so as to further lower down the manufacture cost.

9 Claims, 6 Drawing Sheets

HOLLOW BACKPLANE AND BACKLIGHT MODULE USING SAME

BACKGROUND OF THE INVENTION

1. Field of the Invention

The present invention relates to the field of liquid crystal displaying, and in particular to a hollow backplane and a backlight module using same.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise an enclosure, a liquid crystal panel received in the enclosure, and a backlight module arranged inside the enclosure. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal panel.

Referring to FIG. 1, a liquid crystal display module generally comprises a backlight module 100, a mold frame 300 arranged on the backlight module 100, a liquid crystal display panel 500 arranged on the mold frame 300, and a bezel 700 arranged on the liquid crystal display panel 500. The backlight module 100 comprises a backplane 110, a backlight source 130 arranged inside the backplane 110, a reflector plate 150 arranged inside the backplane 110, and a light guide plate 170 arranged atop the reflector plate 150, and an optic film assembly 190 arranged above the light guide plate 170. The mold frame 300 supports the liquid crystal display panel 500 and the bezel 700 is fixed to the backplane 110 of the backlight module 100 to complete the liquid crystal display module.

The conventional backplane 110 is generally made through stamping a metal sheet. Such a backplane 110 is relatively heavy and is opposite to weight reduction of the liquid crystal display device. Further, both the material cost and the processing cost are high, making it disadvantageous for cost control.

SUMMARY OF THE INVENTION

An object of the present invention is to provide a hollow backplane, which has a simple structure, light weight, low cost and is favorable for weight reduction of liquid crystal display device.

Another object of the present invention is to provide a backlight module, which uses a hollow backplane to greatly reduce manufacture cost and product weight so as to be favorable for weight reduction of liquid crystal display device.

To achieve the above objects, the present invention provides a hollow backplane, which comprises a main body and a heat sink mounted on the main body. The main body comprises a bottom board and a side board connected to the bottom board. The bottom board forms a plurality of hollow sections. Reinforcement ribs are arranged in the hollow sections. The heat sink is mounted to the bottom board.

The main body is integrally formed of a plastic material.

The bottom board comprises a metal reinforcement plate arranged thereon. The reinforcement plate is mounted to the bottom board by screws.

The bottom board contains therein a plurality of metal bars. The main body is injection molded with the metal bars to embed the metal bars in the bottom board.

The bottom board forms an opening corresponding to the heat sink.

The heat sink covers the opening and is secured to the bottom board by screws.

The heat sink forms a retaining section corresponding to the opening. The retaining section is fit to and retained by the opening so as to assemble the heat sink in the opening.

The main body is combined with the heat sink to be subjected to injection molding to form the opening and retain the heat sink in the opening.

The present invention also provides a hollow backplane, which comprises a main body and a heat sink mounted on the main body, the main body comprising a bottom board and a side board connected to the bottom board, the bottom board forming a plurality of hollow sections, reinforcement ribs being arranged in the hollow sections, the heat sink being mounted to the bottom board;

wherein the main body is integrally formed of a plastic material;

wherein the bottom board comprises a metal reinforcement plate arranged thereon, the reinforcement plate being mounted to the bottom board by screws;

wherein the bottom board forms an opening corresponding to the heat sink; and wherein the heat sink covers the opening and is secured to the bottom board by screws.

The present invention also provides a backlight module, which comprises a backplane, a backlight source arranged inside the backplane, a reflector plate arranged inside the backplane, a light guide plate arranged atop the reflector plate, and an optic film assembly arranged above the light guide plate. The backplane is a hollow backplane, which comprises a main body and a heat sink mounted on the main body. The main body comprises a bottom board and a side board connected to the bottom board. The bottom board forms a plurality of hollow sections. Reinforcement ribs are arranged in the hollow sections. The heat sink is mounted to the bottom board. The main body is integrally formed of a plastic material.

The bottom board comprises a reinforcement plate arranged thereon. The reinforcement plate is secured to the bottom board by screws.

The efficacy of the present invention is that the present invention provides a hollow backplane and a backlight module using the backplane, wherein the bottom board of the backplane that is made of plastics is provided with hollow sections to reduce the weight of the backplane and reinforcement ribs are provided to maintain the strength of the backplane, whereby with the strength being maintained, the backplane greatly reduces weight, lowers down cost, and is favorable for weight reduction of liquid crystal display device. Further, the backplane according to the present invention has a simple structure and is easy to manufacture, so as to further lower down the manufacture cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
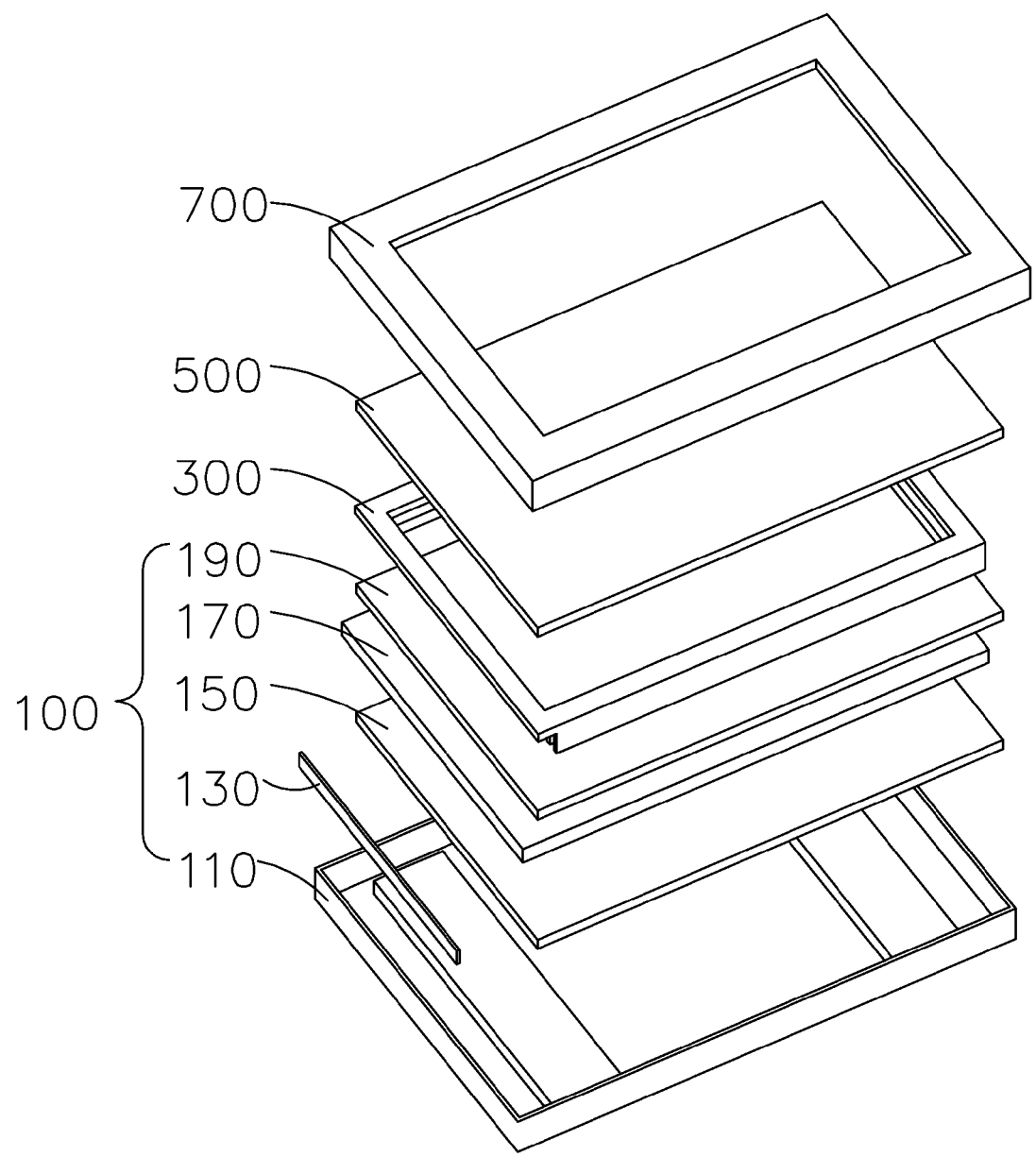
FIG. 1 is an exploded view showing a conventional liquid crystal display module.
Figure 2:
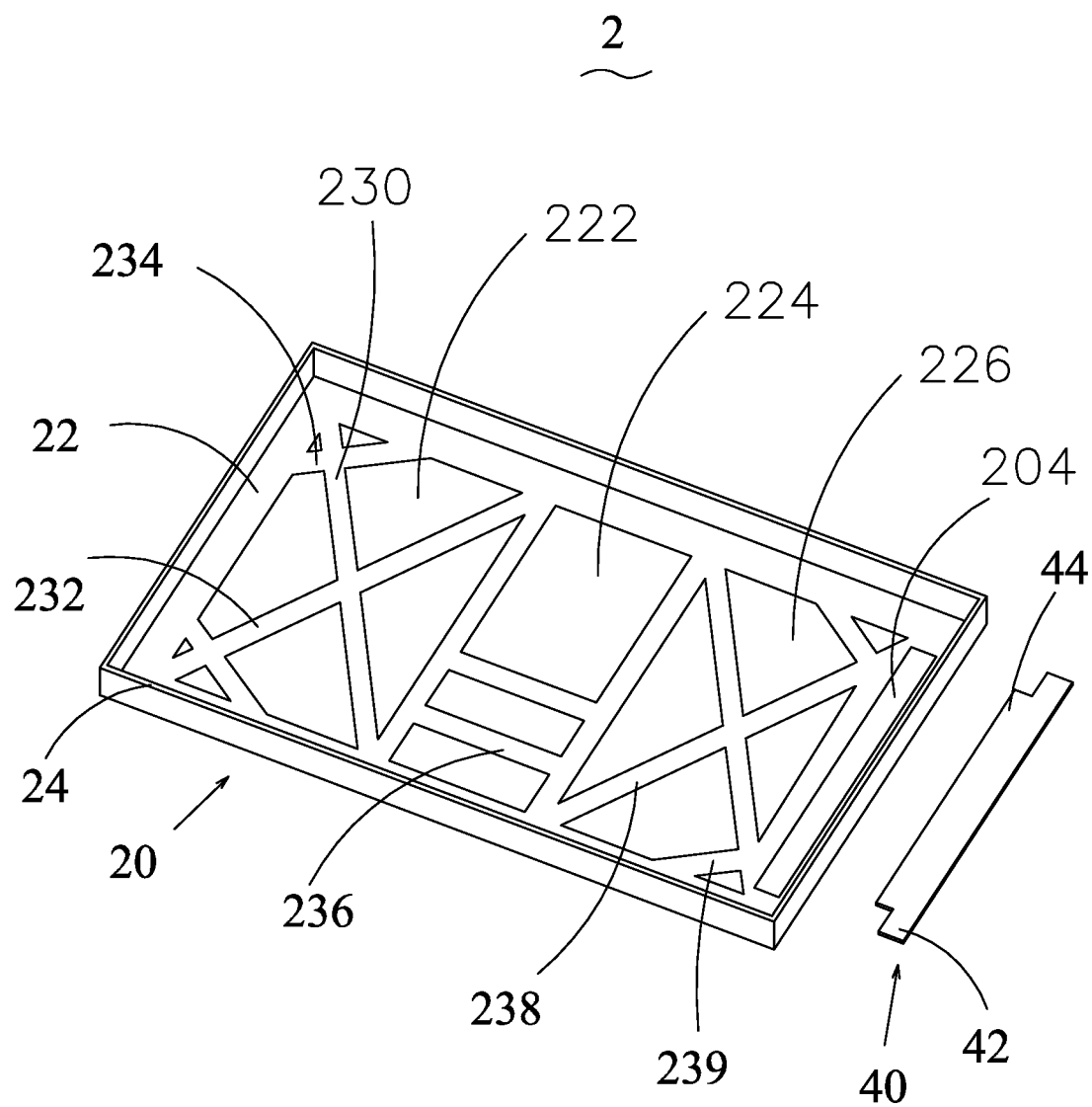
FIG. 2 is an exploded view showing a hollow backplane according to a first embodiment of the present invention.

Referring to FIG. 2, the present invention provides a hollow backplane 2, which comprises: a main body 20 and a heat sink 40 mounted on the main body 20. The main body 20 comprises a bottom board 22 and a side board 24 connected to the bottom board 22. The bottom board 22 forms a plurality of hollow sections 220 and reinforcement ribs 230 are arranged in the hollow sections 220. The heat sink 40 is mounted to the bottom board 22. The main body 20 is integrally formed of plastic materials and is provided with the hollow sections 220 so as to make the cost and weight of the backplane 2 according to the present invention relatively low. The arrangement of the reinforcement ribs 230 ensures the strength of the backplane 2, whereby the backplane 2 according to the present invention effectively reduce the manufacture cost with the strength being ensured so as to facilitate weight reduction of liquid crystal display device.

In the instant embodiment, the hollow sections 220 are of a number of three, which are all make rectangular in shape. To simplify the following description, the three hollow sections 220 will be respectively referred to as first hollow section 222, second hollow section 224, and third hollow section 226. The first hollow section 222 is arranged at one end of the backplane 2 and is distant from the heat sink 40 and comprises two first reinforcement ribs 232 arranged along diagonals to reinforce the strength of the backplane 2. To reinforce the strength of corners of the backplane 2 at the end, the instant embodiment arranges an inclined second reinforcement rib 234 at each of two corners of the first hollow section 222 that are distant from the second hollow section 224. The second hollow section 224 is set at a middle portion of the backplane 2 and has an end portion in which two third reinforcement ribs 236 are arranged. The third reinforcement ribs 236 are substantially parallel to the end of the second hollow section 224. The third hollow section 226 is arranged at an opposite end of the backplane 2 and comprises two fourth reinforcement ribs 238 arranged along diagonals thereof to reinforce the strength of the backplane 2 and two fifth reinforcement ribs 239 respectively set at two corners thereof that are adjacent to the heat sink 40 to reinforce the strength of corners of the backplane 2 at the opposite end.

The heat sink 40 is mounted to a side of the third hollow section 226 that is distant from the second hollow section 224. The bottom board 22 forms a rectangular opening 204 corresponding to the heat sink 40. In the instant embodiment, the heat sink 40 comprises a rectangular body 42 and a raised section 44 projecting from the rectangular body 42. To assemble, the heat sink 40 is set to cover the opening 204 and is secured to the bottom board 22 by screws.

Figure 3:
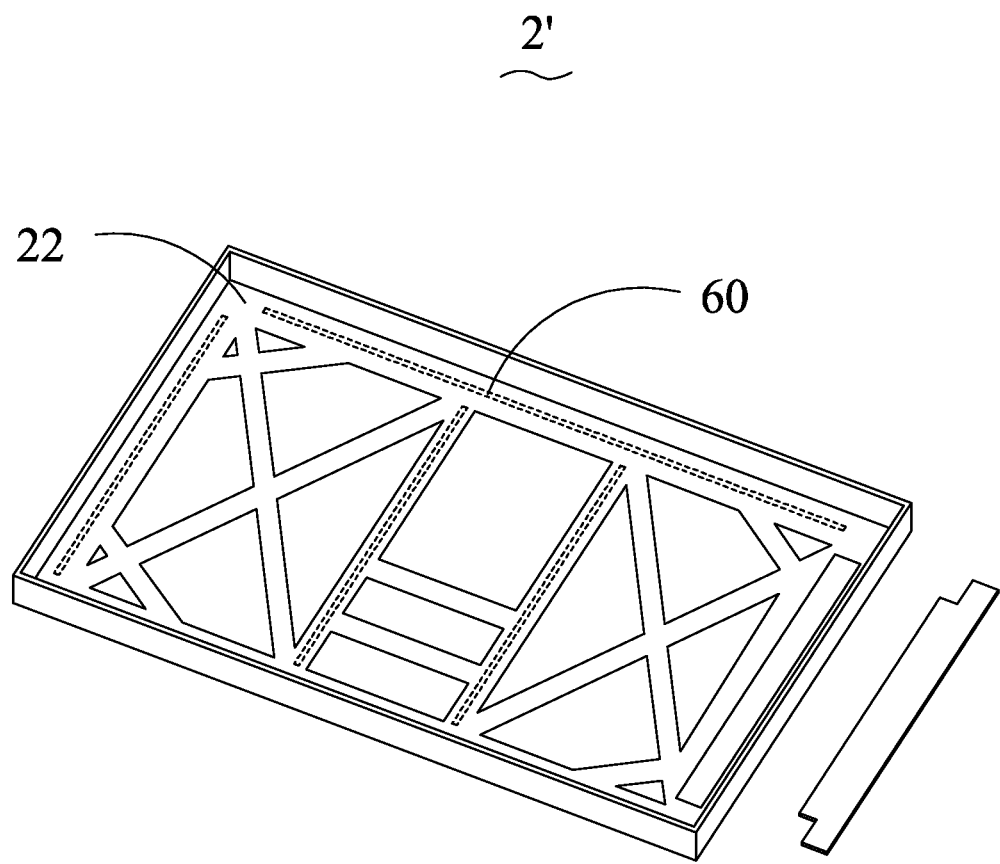
FIG. 3 is an exploded view showing a hollow backplane according to a second embodiment of the present invention.

Referring to FIG. 3, an exploded view of a hollow backplane 2' according to a second embodiment of the present invention is given. In the instant embodiment, the bottom board 22 contains therein a plurality of metal bars 60. The main body 20 is injection-molded with the metal bars 60 so as to embed the metal bars 60 in the bottom board 22 to further reinforce the strength of the backplane 2'.

Figure 4:
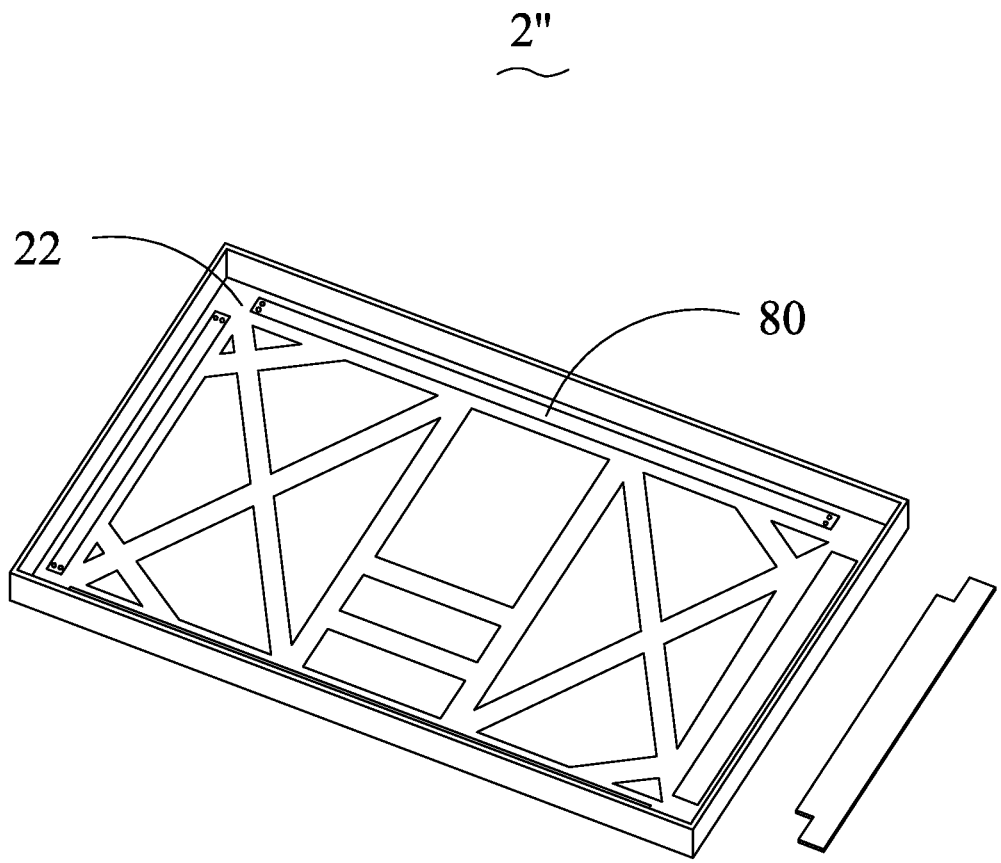
FIG. 4 is an exploded view showing a hollow backplane according to a third embodiment of the present invention.

Referring to FIG. 4, an exploded view of a hollow backplane 2" according to a second embodiment of the present invention is given. In the instant embodiment, the bottom board 22 is provided with metal reinforcement plates 80. The reinforcement plates 80 are fixed to the bottom board 22 by screws to further reinforce the strength of the backplane 2".

Figure 5:
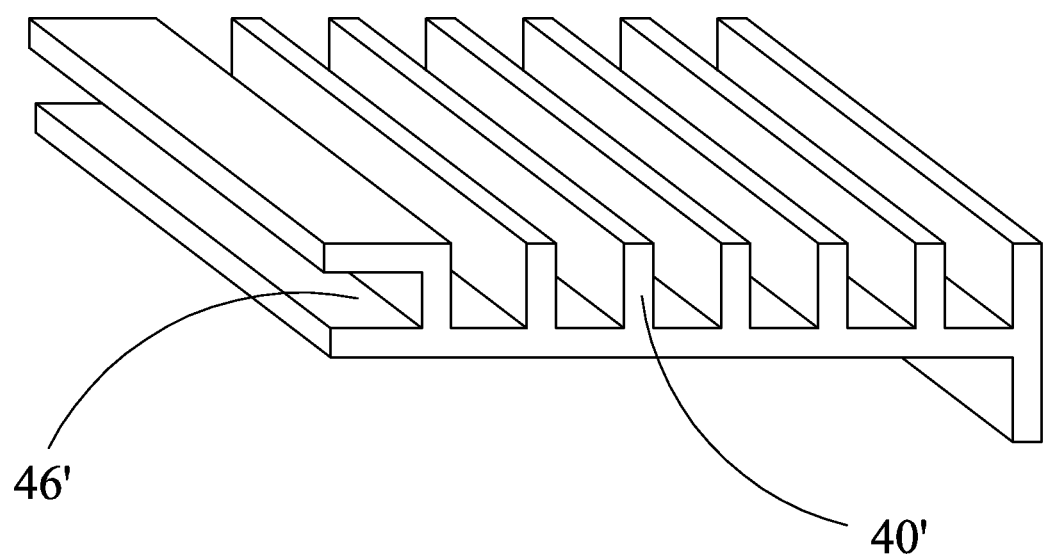
FIG. 5 is a perspective view showing a heat sink of a hollow backplane according to an embodiment of the present invention.

Referring to FIG. 5, a perspective view showing a heat sink of a hollow backplane according to another embodiment of the present invention is given. In the instant embodiment, the heat sink 40' forms a retaining section 46' corresponding to the opening 204 formed in the bottom board 22 of the backplane 2. The retaining section 46' is fit to and thus retained by an edge of the opening 204 so as to assemble the heat sink 40' in the opening 204. Preferably, the heat sink 40' is manufactured first and the main body 20 combined with the heat sink 40' is subjected to injection molding to form the opening 204 and retain the heat sink 40' in the opening 204.

Figure 6:
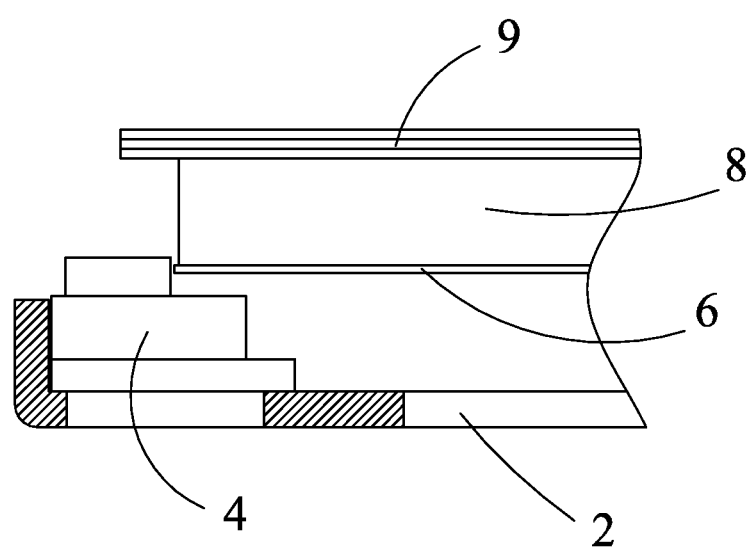
FIG. 6 is a schematic view showing a backlight module according to the present invention.

Referring to FIGS. 2 and 6, the present invention also provides a backlight module, which comprises a backplane 2, a backlight source 4 arranged inside the backplane 2, a reflector plate 6 arranged inside the backplane 2, a light guide plate 8 arranged atop the reflector plate 6, and an optic film assembly 9 arranged above the light guide plate 8. The backplane 2 is a hollow backplane, which comprises a main body 20 and a heat sink 40 mounted on the main body 20. The main body 20 comprises a bottom board 22 and a side board 24 connected to the bottom board 22. The bottom board 22 forms a plurality of hollow sections 220 and reinforcement ribs 230 are arranged in the hollow sections 220. The heat sink 40 is mounted to the bottom board 22. The main body 20 is integrally formed of plastic materials and is provided with the hollow sections 220 so as to make the cost and weight of the backplane 2 according to the present invention relatively low. The arrangement of the reinforcement ribs 230 ensures the strength of the backplane 2, whereby the backplane 2 according to the present invention effectively reduce the manufacture cost with the strength being ensured so as to facilitate weight reduction of liquid crystal display device.

In the instant embodiment, the hollow sections 220 are of a number of three, which are all make rectangular in shape. To simplify the following description, the three hollow sections 220 will be respectively referred to as first hollow section 222, second hollow section 224, and third hollow section 226. The first hollow section 222 is arranged at one end of the backplane 2 and is distant from the heat sink 40 and comprises two first reinforcement ribs 232 arranged along diagonals to reinforce the strength of the backplane 2. To reinforce the strength of corners of the backplane 2 at the end, the instant embodiment arranges an inclined second reinforcement rib 234 at each of two corners of the first hollow section 222 that are distant from the second hollow section 224. The second hollow section 224 is set at a middle portion of the backplane 2 and has an end portion in which two third reinforcement ribs 236 are arranged. The third reinforcement ribs 236 are substantially parallel to the end of the second hollow section 224. The third hollow section 226 is arranged at an opposite end of the backplane 2 and comprises two fourth reinforcement ribs 238 arranged along diagonals thereof to reinforce the strength of the backplane 2 and two fifth reinforcement ribs 239 respectively set at two corners thereof that are adjacent to the heat sink 40 to reinforce the strength of corners of the backplane 2 at the opposite end.

The heat sink 40 is mounted to a side of the third hollow section 226 that is distant from the second hollow section 224. The bottom board 22 forms a rectangular opening 204 corresponding to the heat sink 40. In the instant embodiment, the heat sink 40 comprises a rectangular body 42 and a raised section 44 projecting from the rectangular body 42. To assemble, the heat sink 40 is set to cover the opening 204 and is secured to the bottom board 22 by screws.

It is noted that to further improve the strength of the backplane, metal reinforcement plates may be selectively mounted to the bottom board of the backplane or metal bars may be selectively embedded in the backplane. The metal reinforcement plates can be mounted to the bottom board by screws.

In summary, the present invention provides a hollow backplane and a backlight module using the backplane, wherein the bottom board of the backplane that is made of plastics is provided with hollow sections to reduce the weight of the backplane and reinforcement ribs are provided to maintain the strength of the backplane, whereby with the strength being maintained, the backplane greatly reduces weight, lowers down cost, and is favorable for weight reduction of liquid crystal display device. Further, the backplane according to the present invention has a simple structure and is easy to manufacture, so as to further lower down the manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A hollow backplane, comprising a main body and a heat sink mounted on the main body, the main body comprising a bottom board and a side board connected to the bottom board, the bottom board forming a plurality of hollow sections, reinforcement ribs being arranged in the hollow sections, the heat sink being mounted to the bottom board;
   wherein the main body is integrally formed of a plastic material; and
   wherein the bottom board contains therein a plurality of metal bars, the main body being injection molded with the metal bars to embed the metal bars in the bottom board.

2. The hollow backplane as claimed in claim 1, wherein the bottom board forms an opening corresponding to the heat sink.

3. The hollow backplane as claimed in claim 2, wherein the heat sink covers the opening and is secured to the bottom board by screws.

4. The hollow backplane as claimed in claim 2, wherein the heat sink forms a retaining section corresponding to the opening, the retaining section being fit to and retained by the opening so as to assemble the heat sink in the opening.

5. The hollow backplane as claimed in claim 4, wherein the main body is combined with the heat sink to be subjected to injection molding to form the opening and retain the heat sink in the opening.

6. A hollow backplane, comprising a main body and a heat sink mounted on the main body, the main body comprising a bottom board and a side board connected to the bottom board, the bottom board forming a plurality of hollow sections, reinforcement ribs being arranged in the hollow sections, the heat sink being mounted to the bottom board;
   wherein the main body is integrally formed of a plastic material;
   wherein the bottom board comprises a metal reinforcement plate arranged thereon, the reinforcement plate being mounted to the bottom board by screws;
   wherein the bottom board forms an opening corresponding to the heat sink; and
   wherein the heat sink forms a retaining section corresponding to the opening, the retaining section being fit to and retained by the opening so as to assemble the heat sink in the opening and wherein the main body is combined with the heat sink to be subjected to injection molding to form the opening and retain the heat sink in the opening.

7. A backlight module, comprising a backplane, a backlight source arranged inside the backplane, a reflector plate arranged inside the backplane, a light guide plate arranged atop the reflector plate, and an optic film assembly arranged above the light guide plate, the backplane being a hollow backplane, which comprises a main body and a heat sink mounted on the main body, the main body comprising a bottom board and a side board connected to the bottom board, the bottom board forming a plurality of hollow sections, reinforcement ribs being arranged in the hollow sections, the heat sink being mounted to the bottom board, the backlight source being mounted to the heat sink, the main body being integrally formed of a plastic material;
   wherein the bottom board forms an opening corresponding to the heat sink; and
   wherein the heat sink forms a retaining section corresponding to the opening, the retaining section being fit to and retained by the opening so as to assemble the heat sink in the opening and wherein the main body is combined with the heat sink to be subjected to injection molding to form the opening and retain the heat sink in the opening.

8. The backlight module as claimed in claim 7, wherein the bottom board comprises a reinforcement plate arranged thereon, the reinforcement plate being secured to the bottom board by screws.

9. The backlight module as claimed in claim 7, wherein the bottom board contains therein a plurality of metal bars, the main body being injection molded with the metal bars to embed the metal bars in the bottom board.

* * * * *